United States Patent
Zurbau

(10) Patent No.: US 10,245,722 B2
(45) Date of Patent: Apr. 2, 2019

(54) ROBOT SYSTEM COMPRISING A ROBOT AND TWO DEVICES THAT CAN BE CONNECTED TO SAID ROBOT IN AN ALTERNATING MANNER, AND METHOD FOR CHANGING SAID DEVICES

(75) Inventor: Ovidiu Zurbau, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 1322 days.

(21) Appl. No.: 13/885,293

(22) PCT Filed: Oct. 31, 2011

(86) PCT No.: PCT/EP2011/005499
§ 371 (c)(1),
(2), (4) Date: May 14, 2013

(87) PCT Pub. No.: WO2012/069131
PCT Pub. Date: May 31, 2012

(65) Prior Publication Data
US 2013/0274918 A1    Oct. 17, 2013

(30) Foreign Application Priority Data

Nov. 24, 2010 (DE) .......... 10 2010 052 394

(51) Int. Cl.
*B25J 9/16* (2006.01)
*H04L 29/12* (2006.01)

(52) U.S. Cl.
CPC .......... *B25J 9/16* (2013.01); *H04L 29/12028* (2013.01); *H04L 61/103* (2013.01)

(58) Field of Classification Search
CPC . B25J 9/16; B25J 15/04; H04L 61/103; H04L 29/12028; H04L 29/12018;
(Continued)

(56) References Cited

U.S. PATENT DOCUMENTS 7,374,524 B2    5/2008  McCormick
8,943,188 B2 *  1/2015  Busgen et al. ................ 709/224
(Continued)

FOREIGN PATENT DOCUMENTS

CN    101681154 B    10/2012
DE    600 32 263 T2   6/2007
(Continued)

OTHER PUBLICATIONS

Chinese Patent Office; Examination Report in Chinese Patent Application No. 201180034006.5 dated Jul. 15, 2014; 12 pages.
(Continued)

*Primary Examiner* — Sargon N Nano
(74) *Attorney, Agent, or Firm* — Dorton & Willis, LLP

(57) ABSTRACT

The invention relates to a method for changing devices (W1, D1; W2, D2) which are connected to a robot (R) and which communicate with a robot application (APP), having the following steps: S2: detecting a disconnection of a communication with a first device (W1, D1); S3: removing an address entry ("MAC1/IP1") for the first device from a communication index (ARP); S4: establishing communication with a second device (W2, D2); and S5: generating an address entry ("MAC2/IP1") for the second device in the communication index.

13 Claims, 1 Drawing Sheet

(58) Field of Classification Search
CPC .......... H04L 29/12037; H04L 29/1233; G05B 2219/49304; G05B 2219/45104; Y10S 901/02; B01L 3/0275; B23K 9/32; G01N 35/0099; Y10T 29/49826
See application file for complete search history.

(56) References Cited

U.S. PATENT DOCUMENTS

| | | |
|---|---|---|
| 2005/0065647 A1 | 3/2005 | Perry et al. |
| 2006/0149418 A1* | 7/2006 | Anvari .................. A61G 13/10 700/245 |
| 2006/0184272 A1* | 8/2006 | Okazaki ................ B25J 9/1697 700/245 |
| 2007/0291704 A1* | 12/2007 | Guo et al. ...................... 370/338 |
| 2008/0040911 A1* | 2/2008 | De Koning ...... G05B 19/41825 483/1 |
| 2009/0158082 A1* | 6/2009 | Jain et al. ......................... 714/4 |
| 2010/0094462 A1* | 4/2010 | Sugihara et al. ............. 700/258 |
| 2010/0115067 A1 | 5/2010 | Brant et al. |
| 2012/0158997 A1* | 6/2012 | Hsu et al. ..................... 709/242 |
| 2012/0254385 A1* | 10/2012 | Masputra ...................... 709/223 |
| 2014/0325651 A1* | 10/2014 | Kim et al. ...................... 726/23 |

FOREIGN PATENT DOCUMENTS

| | | |
|---|---|---|
| DE | 10 2007 025 892 A1 | 12/2008 |
| EP | 2 110 725 A1 | 10/2009 |
| EP | 2218557 A2 | 8/2010 |
| WO | 02/05107 A1 | 7/2000 |

OTHER PUBLICATIONS

Chinese Patent Office; Search Report in Chinese Patent Application No. 201180034006.5 dated Jul. 4, 2014; 2 pages.
Martin A. Brown; Guide to IP Layer Network Administration With Linux; published Apr. 2003; 197 pages.
European Patent Office; Search Report in International Patent Application No. PCT/EP2011/005499 dated Mar. 5, 2012; 4 pages.
German Patent Office; Search Report in German Patent Application No. 10 2010 052 396.8 dated Jul. 6, 2011; 8 pages.
German Patent Office; Search Report in German Patent Application No. 10 2010 052 394.1 dated Jul. 18, 2013; 8 pages.

* cited by examiner

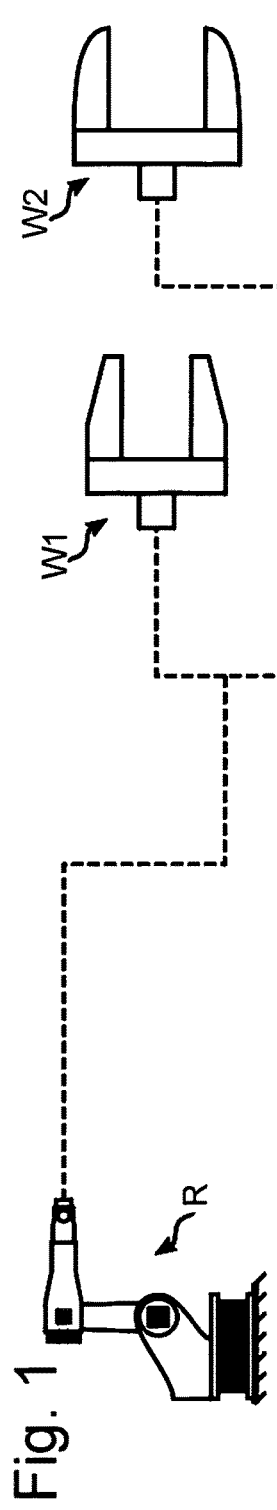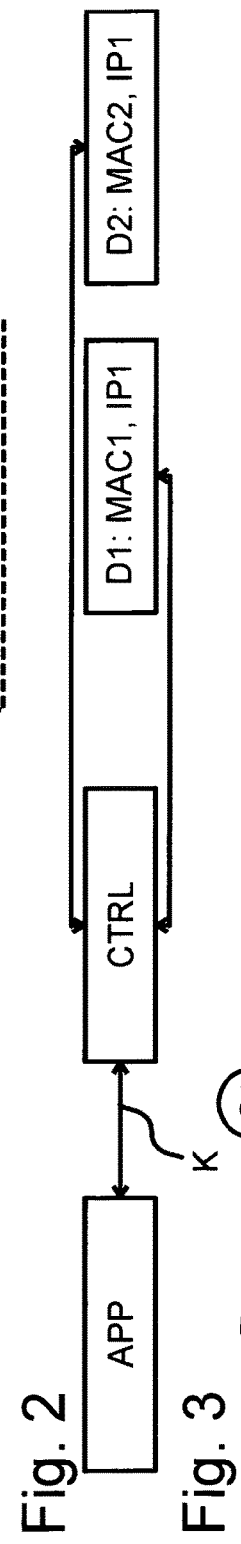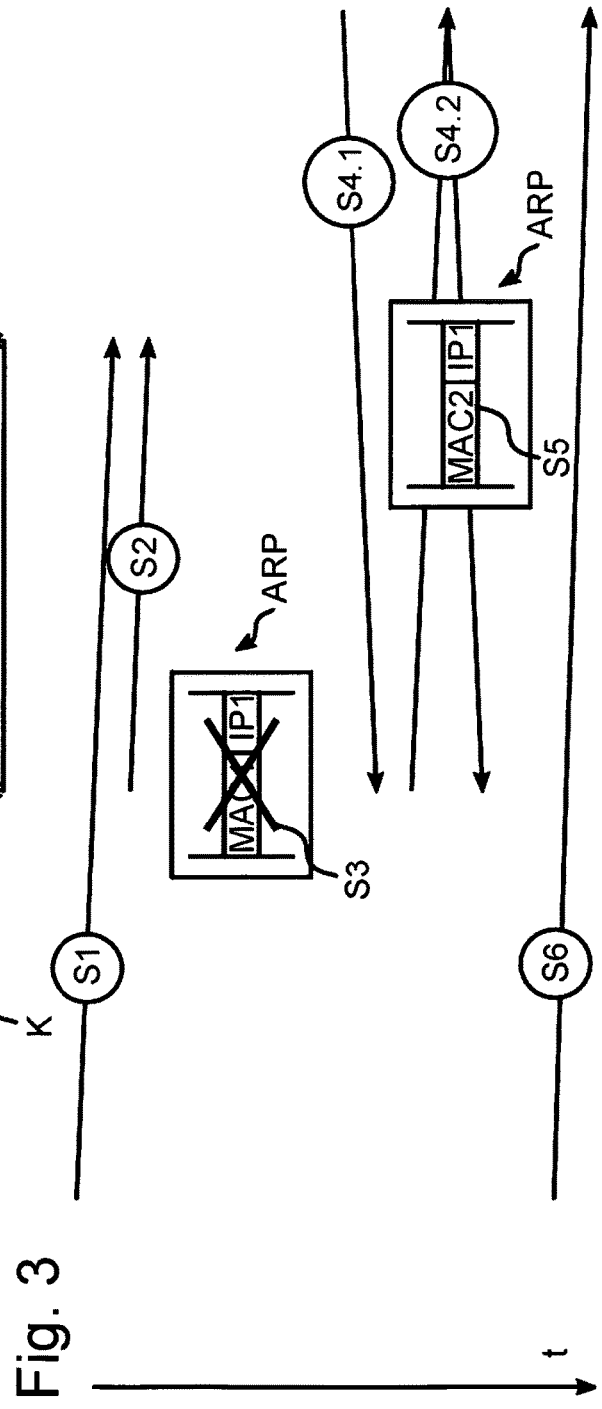

ROBOT SYSTEM COMPRISING A ROBOT AND TWO DEVICES THAT CAN BE CONNECTED TO SAID ROBOT IN AN ALTERNATING MANNER, AND METHOD FOR CHANGING SAID DEVICES

The present invention concerns a robot system having a robot and two devices, which can be alternately connected thereto, a method for changing from a device connected to a robot, and a computer program product having a program for executing a method of this type.

With robot systems having one or more robots, a tool exchange is frequently necessary in the industrial practice, e.g. the exchanging of various grippers having different geometries, kinematics, etc.

According to internal practices, a robot application, which can process, in particular, movement commands, for example "open/close gripper" and exchange commands, for example "exchange gripper 1 with gripper 2," communicates with the individual tools by means of a PROFINET IO network, such as that defined, for example, in the Norm IEC 61158 and IEC 61784.2.

According to prior internal practices, the individual tools are all configured in parallel thereby as their own PROFINET devices or slaves, each being assigned its own IP address and its own name. It is disadvantageous that for this purpose a correspondingly large number of inputs and outputs must be provided, which increases with each additional exchangeable tool, thus increasing the expenditure in terms of configuration and data accumulation. If 64 inputs/outputs are provided for a tool, by way of example, then three interchangeable tools already require 192 inputs/outputs, and the configuration of three different PROFINET devices.

A conceivable solution would be to provide only one PROFINET device for the different, interchangeable tools in the communication, in particular for the PROFINET controller or master, and to configure those PROFINET devices with the same IP addresses and the same names. The configuration and data expenditures are reduced accordingly.

If then, for example, a gripper 1 is replaced by a gripper 2, the two associated PROFINET devices have the same IP addresses and the same names, but different device-specific MAC identifiers, which are normally provided by the manufacturer on a one-to-one or unique basis.

While the work with gripper 1 was assigned to the IP address corresponding to an ARP table of its MAC identifier, and the robot application was able to communicate with the gripper 1 coupled thereto with its MAC identifier via this IP address by means of the PROFINET controller.

If then, instead of gripper 1, gripper 2 is now coupled thereto, its MAC identifier no longer corresponds to the ARP entry. Packets sent by the PROFINET controller to the IP address are lost accordingly.

This is detected by the PROFINET controller after a certain time period, due to a time-out, at which point it sends an ARP query and establishes communication with the PROFINET device for the gripper 2, coupled thereto, wherein its MAC identifier is entered with the same IP address in the ARP table. Aside from the problem that packets are lost, a relatively long period of time elapses, in practice 1-2 seconds, for example, until an ARP query is sent as a result of the time out, at which point the new communication is established. This is, particularly in the case of frequent tool exchanges in industrial automation, undesired, as it slows down the process.

In EP 1 307 823 B1 it is proposed that a replacement device for a defective device issues a BOOTP query, at which point a monitor agent device issues the IP address of the defective device to the replacement device if it has determined that the port addresses of both devices are the same.

The objective of the invention is to improve the exchange of devices that can be selectively connected to a robot.

This objective is obtained by means of a method according to claim 1. Claim 10 protects a robot system that is configured to execute a method according to the invention, claim 11 protects a computer program product, particularly a machine readable data medium or storage medium, having a program for executing a method according to the invention. The dependent Claims relate to advantageous further developments.

A robot system comprises one or more robots. Two or more systems are provided for at least one of these robots, which can be alternately connected to said robots. A system preferably exhibits a network communication means, in particular, a field device, for establishing a connection to a communication means, in particular a network, preferably a PROFINET network, ideally a PROFINET JO network, as well as one or more tools, such as a gripper, and/or one or more other peripheral devices. With a PROFINET (IO) network, the network communication means exhibits a so-called PROFINET (IO) device or, respectively, a PROFINET (IO) slave.

The robot system furthermore comprises a robot application, for example a system or robot control and/or a program that is processed by said control. The robot application issues commands for the device, in particular to a control for at least one tool and/or other peripheral devices of the system, in particular action and/or motion commands such as "open/close gripper," "activate/deactivate retaining magnet/welding current/paint output" or suchlike, and/or system exchange commands such as "disengage system 1," "engage system 2" and so on. The robot application communicates with the system, in particular its control, preferably via a network, wherein a network master is provided, which sends commands for the robot application to the corresponding network slave of the system, which in turn preferably sends said commands to a controller for the system. With a PROFINET (IO) network, the network master exhibits a PROFINET (IO) controller, or master, respectively.

According to the present invention, an interruption of communication with a first system is detected, in particular by means of the network master. For this, the master can, for example, execute a watchdog function for monitoring the communication with the slave, in that it, for example, cyclically checks for the existence of a presence signal. In a preferred embodiment, a stack provides call-back information to a driver when disconnection from, or the absence of, the slave has been detected.

In accordance with the invention, at this point an address entry for the first system is removed from a communication directory. Preferably one or more communication identifiers and a system specific, preferably a one-to-one or unique, identifier assigned to the system, are assigned to one another on a one-to-one basis in the communication directory. A communication identifier is preferably assigned to a system during a configuration of the system or network, in particular, a configuration of the slave. In a preferred design, different systems, which can be alternately connected to the robot, having different specific identifiers, are assigned identical communication identifiers.

The communication directory can exhibit, or be, in particular, an ARP directory or an ARP table, respectively, wherein ARP stands for, in particular, "Address Resolution Protocol." A specific, or unique identifier can, in particular, be a physical address, preferably an MAC identifier or MAC address, wherein MAC stands for, in particular, "Medium Access Control." A communication identifier can, in particular, be an IP address and/or a name, wherein IP stands for, in particular, "Internet Protocol."

Preferably the address entry for the first system is removed from the communication directory as soon as an interruption in the communication with the first system has been detected. If then a communication is established with a second system, due to the missing address entry an address entry for the second system is established immediately in the communication directory, preferably in that an ARP query is issued.

Thus, it is no longer necessary to wait until, for example, an ARP query has been issued and, based thereon, the ARP entry is carried out, because instead, a network master immediately detects, due to the missing ARP entry when a new slave is reported, the necessity for an ARP query. Packets are also not lost which have been issued with an IP address to a no longer present slave, because these packets are no longer issued due to the missing ARP entry. It has been shown in tests that due to the removal, in accordance with the invention, of the address entry for the removed system, the system exchange can occur significantly faster, advantageously within an FSU ("Fast Start Up") time frame.

For this, in particular, the establishment of communication with the second system can be carried out in a fast start-up, in particular an FSU, preferably within at most 0.75 seconds, in particular, within at most 0.55 seconds. A PROFINET Fast Start Up preferably comprises a so-called Hello-Request from the newly connected second PROFINET slave as well as a subsequent alternating communication between the PROFINET master and slave with a so-called Connect-Request, or Response, respectively.

It is preferably provided that the address entry for the first system is removed from the communication directory before the communication with the second system is established, in order to immediately begin to establish communication and generate the address entry for the second system when the second system has been connected, as a result of the missing address entry. In particular, it is preferably provided that the address entry for the first system is removed from the communication directory as soon as an interruption in the communication with the first system has been detected.

A disconnection of the first system for the purpose of exchanging the system may occur intentionally. In addition, an unintentional loss of the system, for example, can lead to an interruption in the communication, which should, for example, be detected by a network master, which then establishes a time-out for the other communication addresses present in the communication directory. For this reason, it is provided in a preferred design that a command for a system exchange in the robot application is detected, and the address entry for the first system is only then removed from the communication directory if a command for a system exchange in the robot application, and the interruption of the communication with the first system, has been detected.

The communication and the first and second system can be configured in advance in a preferred design. In particular, a network, as well as an associated master and the slaves, can be configured, wherein, preferably, different, alternately connectable systems are assigned the same communication addresses, in particular names and/or IP addresses, such that the robot application, or the master, respectively, can always address the respective connected systems at the same IP address.

Further advantages and characteristics can be derived from the dependent claims and the embodiment examples. For this, the drawing show, in part schematically:

FIG. 1 a robot and two tools of a robot system according to one design of the present invention;

FIG. 2 a robot application, a PROFINET IO master and two PROFINET JO slaves for the robot system from FIG. 1; and FIG. 3 from top to bottom, the sequence for a method according to one design of the present invention for exchanging one tool for another tool in the robot system of FIG. 1.

FIG. 1 shows an industrial robot R, to Which a tool W1, or a different tool W2, is to be alternately attached, in order to execute different sub-tasks of an automated process, such as an assembly, for example.

FIG. 2 shows a PROFINET IO network K for this purpose, by means of which a robot application APP controls the tool W1 or W2, respectively. The tools W1, W2 form, collectively with a respective PROFINET IO device D1 or D2, or a PROFINET IO field device or slave, respectively, a system (W1, D1) or (W2, D2), respectively, in each case.

With the configuration of the PROFINET IO network, the slave D1, having the specific or unique MAC address "MAC1" permanently assigned by the manufacturer in a ROM of a network card, is assigned an IP address "IP1." The slave D2, having the corresponding MAC address "MAC2" is assigned the same IP address "IP1," because the two tools W1, W2 are implemented alternately, and are to be addressed by the robot application APP in a uniform manner. Furthermore, a PROFINET IO controller, or master CTRL, respectively, having a drive and a stack (not shown), is provided in the network K, which, in particular, transmits commands from the robot application APP to the respective tool W1 or W2 by means of the associated slave D1 or D2, respectively.

For a tool exchange from tool W1 to tool W2, the robot application APP first issues a system exchange command S1, as depicted in FIG. 3, which illustrates the temporal procedural sequence from top to bottom.

The robot R moves for this purpose into a deposition pose (not shown) in which the tool W1 is physically removed from the robot R. The thereby resulting interruption in communication with the associated slave D1 is detected by the master CTRL by means of a corresponding watchdog query S2, for example.

Because a corresponding system exchange command S1 has been detected in advance, the master CTRL detects that the intended separation has occurred, and promptly deletes the corresponding address entry in an ARP table, in which the assignment of the specific MAC address "MAC1" for the system (W1, D1) of the communication address "IP1" for addressing the tool connected to the robot has been stored following the initial establishment of communication (not shown) with the salve D1. The deletion is indicated in FIG. 3 by a crossing out thereof (FIG. 3: "S3").

At this point the second system is connected to the robot in that the tool W2 is physically attached thereto, and its slave D2 is connected to the network K. This then sends a hello-request to the master CTRL (FIG. 3: "S4.1").

Due to the deletion of the address entry "MAC1|IP1" in accordance with the invention, resulting from the separation of the first system (W1, D1), the master CTRL promptly issues, without having to wait for a time-out, an ARP request and thus establishes the communication with the new slave D2. This establishment of communication with the initial Hello-request S4.1 and subsequent undifferentiated depicted requests and responses S4.2 occurs as a PROFINET IO Fast Start Up within approximately 0.5 seconds. For this, in particular, an address entry "MAC2|IP1" is carried out in the ARP table ARP, which assigns the specific MAC address "MAC2" of the slave D2 and the IP address "IP1" to one another, by means of which the robot application APP, or the master CTRL addresses the connected tool.

At this point the robot application can issue commands to the new tool W2 (FIG. 3: "S6"), such as "open gripper" or the like, for example.

With a renewed tool exchange, for example, back to tool 1, or to another tool, not shown here, a system exchange command is executed in an analogous manner, the interruption in the communication is detected, as a result of which the ARP entry is deleted, the communication with the new slave is established in a Fast Start Up, and its MAC and IP addresses are filed in the ARP table thereby.

As shown, the tool exchange can occur more quickly in the time frame provided in a Fast Start Up, without packet losses, because the master CTRL, or its TCP/IP stack (not shown in detail) is forced, by the intentional removal and thus missing ARP entry for this IP address, to issue an ARP query prior to packets being sent to this IP address. Thus, a currently present MAC address is always present in the ARP table.

LIST OF REFERENCE SYMBOLS

APP robot application
ARP ARP table (communication directory)
CTRL network (PROFINET JO) master
D1, D2 field device (PROFINET JO device)
IP1 IP address (communication identifier)
MAC1,
MAC2 MAC address (specific identifier)
R Robot
S1, . . . S6 Method steps
t time (method sequence)
W1, W2 tool

The invention claimed is:

1. A method for exchanging systems connected to a robot, which communicate with a robot application, the method comprising:
removing a first system from an arm of the robot and connecting a second system to the arm of the robot, the first and second systems being selectively, alternately attachable to the arm of the robot;
detecting an interruption in a communication with the first system;
removing an address entry for the first system from a communication directory;
establishing communication with the second system; and
creating an address entry for the second system in the communication directory.

2. The method according to claim 1, wherein the communication occurs via a PROFINET network.

3. The method according to claim 1, wherein the establishment of the communication with the second system occurs in a fast start-up, in particular a Fast Start Up.

4. The method according to claim 3, wherein the establishment of the communication with the second system occurs within a maximum of 0.75 seconds.

5. The method according to claim 1, wherein the address entry for the first system is removed from the communication directory before the communication with the second system has been established.

6. The method according to claim 1, further comprising:
detecting a system exchange command from the robot application.

7. The method according to claim 6, wherein the address entry for the first system is removed from the communication directory when a system exchange command from the robot application and the interruption in communication with the first system have been detected.

8. The method according to claim 1, wherein the first and second systems exhibit different specific identifiers and identical communication identifiers.

9. The method according to claim 1, further comprising:
configuring the communication and the first and second system in advance.

10. A robot system, comprising:
at least one robot,
at least two systems that can be alternately mechanically connected to an arm of the robot,
a robot application,
a communication means, and
a computer comprising a storage medium including program code that, when executed by the computer, causes the computer to:
detect an interruption in a communication with a first system when the first system is removed from the arm of the robot;
remove an address entry for the first system from a communication directory;
establish communication with a second system when the second system is connected to the arm of the robot; and
create an address entry for the second system in the communication directory.

11. A computer program product having programming code stored on a non-transitory machine readable data medium, the programming code configured to, when executed by a computer, cause the computer to:
detect an interruption in a communication with a first system that is selectively attachable to an arm of a robot when the first system is removed from the arm of the robot;
remove an address entry for the first system from a communication directory;
establish communication with a second system that is selectively attachable to the arm of the robot when the second system is connected to the arm of the robot; and
create an address entry for the second system in the communication directory.

12. The method according to claim 2, wherein THE PROFINET network is a PROFINET 10 network.

13. The method according to claim 4, wherein the establishment of the communication with the second system occurs within a maximum of 0.55 seconds.

* * * * *